US008356035B1

(12) United States Patent
Baluja et al.

(10) Patent No.: US 8,356,035 B1
(45) Date of Patent: Jan. 15, 2013

(54) ASSOCIATION OF TERMS WITH IMAGES USING IMAGE SIMILARITY

(75) Inventors: Shumeet Baluja, Santa Clara, CA (US); Yushi Jing, Mountain View, CA (US)

(73) Assignee: Google Inc., Mountain View, CA (US)

( * ) Notice: Subject to any disclaimer, the term of this patent is extended or adjusted under 35 U.S.C. 154(b) by 742 days.

(21) Appl. No.: 11/733,734

(22) Filed: Apr. 10, 2007

(51) Int. Cl.
*G06F 7/00* (2006.01)
*G06F 17/30* (2006.01)
(52) U.S. Cl. ...................................................... 707/741
(58) Field of Classification Search ....... 707/3, 999.003, 707/741
See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |
| 5,848,397 A | 12/1998 | Marsh et al. |
| 5,913,205 A | 6/1999 | Jain et al. |
| 5,918,014 A | 6/1999 | Robinson |
| 5,948,061 A | 9/1999 | Merriman |
| 5,991,429 A | 11/1999 | Coffin et al. |
| 6,009,422 A | 12/1999 | Ciccarelli |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman et al. |
| 6,167,382 A | 12/2000 | Sparks et al. |
| 6,256,648 B1 | 7/2001 | Hill et al. |
| 6,269,361 B1 | 7/2001 | Davis et al. |
| 6,356,659 B1 | 3/2002 | Wiskott et al. |
| 6,389,372 B1 | 5/2002 | Glance et al. |
| 6,400,853 B1 * | 6/2002 | Shiiyama ...................... 382/305 |
| 6,401,075 B1 | 6/2002 | Mason et al. |
| 6,549,896 B1 | 4/2003 | Candan et al. |
| 6,594,673 B1 | 7/2003 | Smith et al. |
| 6,721,733 B2 | 4/2004 | Lipson et al. |
| 6,792,419 B1 | 9/2004 | Raghavan |
| 6,816,836 B2 | 11/2004 | Basu et al. |
| 6,985,882 B1 | 1/2006 | Del Sesto |
| 7,035,467 B2 | 4/2006 | Nicponski |
| 7,039,599 B2 | 5/2006 | Merriman |

(Continued)

FOREIGN PATENT DOCUMENTS

EP    1 544 729    6/2005

(Continued)

OTHER PUBLICATIONS

Monay, Florent and Daniel Gatica-Perez. "On Image Auto-Annotation with Latent Space Models." MM'03, Nov. 2-8, 2003. ACM: 2003.*

(Continued)

*Primary Examiner* — Kimberly Wilson
(74) *Attorney, Agent, or Firm* — Fish & Richardson P.C.

(57) ABSTRACT

Methods, systems, and apparatus, including computer program products, for associating terms with images. A plurality of images is received. One or more of the received images are associated with one or more terms. Degrees of similarity between a plurality of pairs of images in the plurality of images is determined. A respective weight with respect to a first image of the plurality of images is assign to one or more of the terms based at least on the degrees of similarity. One or more of the terms are selected based on the respective weights of the terms with respect to the first image, and the selected terms are associated with the respective image.

26 Claims, 6 Drawing Sheets

U.S. PATENT DOCUMENTS

| | | |
|---|---|---|
| 7,136,875 B2 | 11/2006 | Anderson et al. |
| 7,324,670 B2 | 1/2008 | Kozakaya et al. |
| 7,492,943 B2 | 2/2009 | Li et al. |
| 7,689,682 B1 | 3/2010 | Eldering et al. |
| 7,701,608 B2 | 4/2010 | Katayama et al. |
| 7,739,276 B2 | 6/2010 | Lee et al. |
| 7,765,218 B2 | 7/2010 | Bates et al. |
| 7,801,907 B2 | 9/2010 | Fischer et al. |
| 7,801,956 B1 | 9/2010 | Cumberbatch et al. |
| 7,809,163 B2 | 10/2010 | Sheu |
| 7,831,595 B2 | 11/2010 | Suresh et al. |
| 7,853,622 B1 | 12/2010 | Baluja et al. |
| 8,027,541 B2 * | 9/2011 | Hua et al. .................... 382/190 |
| 2002/0023230 A1 | 2/2002 | Bolnick et al. |
| 2002/0116466 A1 | 8/2002 | Trevithick et al. |
| 2002/0120506 A1 | 8/2002 | Hagen |
| 2002/0124053 A1 | 9/2002 | Adams et al. |
| 2003/0013951 A1 * | 1/2003 | Stefanescu et al. ............ 600/407 |
| 2003/0050977 A1 | 3/2003 | Puthenkulam et al. |
| 2004/0042599 A1 | 3/2004 | Zaner et al. |
| 2004/0088325 A1 | 5/2004 | Elder et al. |
| 2004/0098362 A1 * | 5/2004 | Gargi ............................ 707/1 |
| 2004/0122803 A1 | 6/2004 | Dom et al. |
| 2004/0143841 A1 | 7/2004 | Wang et al. |
| 2004/0148275 A1 | 7/2004 | Achlioptas |
| 2004/0202349 A1 | 10/2004 | Erol et al. |
| 2004/0215793 A1 | 10/2004 | Ryan et al. |
| 2004/0267604 A1 | 12/2004 | Gross |
| 2005/0043897 A1 | 2/2005 | Meyer |
| 2005/0091202 A1 | 4/2005 | Thomas |
| 2005/0114325 A1 * | 5/2005 | Liu et al. ........................ 707/3 |
| 2005/0125308 A1 | 6/2005 | Puentes et al. |
| 2005/0125408 A1 | 6/2005 | Somaroo et al. |
| 2005/0144069 A1 | 6/2005 | Wiseman et al. |
| 2005/0149395 A1 | 7/2005 | Henkin et al. |
| 2005/0154639 A1 | 7/2005 | Zetmeir |
| 2005/0159998 A1 | 7/2005 | Buyukkokten et al. |
| 2005/0171832 A1 | 8/2005 | Hull et al. |
| 2005/0198031 A1 | 9/2005 | Pezaris et al. |
| 2005/0216300 A1 | 9/2005 | Appelman et al. |
| 2005/0278433 A1 | 12/2005 | Winner et al. |
| 2005/0278443 A1 | 12/2005 | Winner et al. |
| 2006/0004704 A1 | 1/2006 | Gross |
| 2006/0031121 A1 | 2/2006 | Speicher |
| 2006/0069584 A1 | 3/2006 | Bates et al. |
| 2006/0085259 A1 | 4/2006 | Nicholas et al. |
| 2006/0136098 A1 | 6/2006 | Chitrapura et al. |
| 2006/0165040 A1 | 7/2006 | Rathod et al. |
| 2006/0184617 A1 | 8/2006 | Nicholas et al. |
| 2006/0190225 A1 | 8/2006 | Grand |
| 2006/0195442 A1 | 8/2006 | Cone et al. |
| 2006/0200432 A1 | 9/2006 | Flinn et al. |
| 2006/0200434 A1 | 9/2006 | Flinn et al. |
| 2006/0200435 A1 | 9/2006 | Flinn et al. |
| 2006/0204142 A1 | 9/2006 | West et al. |
| 2006/0218577 A1 | 9/2006 | Goodman et al. |
| 2006/0224675 A1 | 10/2006 | Fox et al. |
| 2006/0247940 A1 | 11/2006 | Zhu et al. |
| 2006/0248573 A1 | 11/2006 | Pannu et al. |
| 2006/0271460 A1 | 11/2006 | Hanif |
| 2006/0282328 A1 | 12/2006 | Gerace et al. |
| 2006/0294084 A1 | 12/2006 | Patel et al. |
| 2006/0294134 A1 | 12/2006 | Berkhim et al. |
| 2007/0005341 A1 | 1/2007 | Burges et al. |
| 2007/0043688 A1 | 2/2007 | Kountz et al. |
| 2007/0043766 A1 | 2/2007 | Nicholas et al. |
| 2007/0050446 A1 | 3/2007 | Moore |
| 2007/0106551 A1 | 5/2007 | McGucken |
| 2007/0121843 A1 | 5/2007 | Atazky et al. |
| 2007/0124721 A1 | 5/2007 | Cowing et al. |
| 2007/0156614 A1 | 7/2007 | Flinn et al. |
| 2007/0192306 A1 * | 8/2007 | Papakonstantinou et al. .... 707/5 |
| 2007/0203872 A1 | 8/2007 | Flinn et al. |
| 2007/0203940 A1 * | 8/2007 | Wang et al. .............. 707/103 R |
| 2007/0218900 A1 | 9/2007 | Abhyanker |
| 2007/0288462 A1 | 12/2007 | Fischer et al. |
| 2008/0004951 A1 | 1/2008 | Huang et al. |
| 2008/0010275 A1 | 1/2008 | Lee et al. |
| 2008/0091834 A1 | 4/2008 | Norton |
| 2008/0103784 A1 | 5/2008 | Wong et al. |
| 2008/0103877 A1 | 5/2008 | Gerken |
| 2008/0104079 A1 | 5/2008 | Craig |
| 2008/0104225 A1 | 5/2008 | Zhang et al. |
| 2008/0120308 A1 | 5/2008 | Martinez et al. |
| 2008/0120411 A1 | 5/2008 | Eberle |
| 2008/0126476 A1 | 5/2008 | Nicholas et al. |
| 2008/0140650 A1 | 6/2008 | Stackpole |
| 2008/0155080 A1 | 6/2008 | Marlow et al. |
| 2008/0159590 A1 * | 7/2008 | Yi et al. ........................ 382/103 |
| 2008/0162431 A1 | 7/2008 | Xu et al. |
| 2008/0189169 A1 | 8/2008 | Turpin et al. |
| 2008/0195657 A1 | 8/2008 | Naaman et al. |
| 2008/0215416 A1 | 9/2008 | Ismalon et al. |
| 2008/0222295 A1 | 9/2008 | Robinson et al. |
| 2008/0243607 A1 | 10/2008 | Rohan et al. |
| 2008/0249966 A1 | 10/2008 | Luege Mateos |
| 2008/0275899 A1 | 11/2008 | Baluja et al. |
| 2009/0018918 A1 | 1/2009 | Moneypenny et al. |
| 2009/0024548 A1 | 1/2009 | Zhu et al. |
| 2009/0063284 A1 | 3/2009 | Turpin et al. |
| 2009/0076800 A1 | 3/2009 | Li et al. |
| 2009/0112701 A1 | 4/2009 | Turpin et al. |
| 2009/0144075 A1 | 6/2009 | Flinn et al. |
| 2009/0192967 A1 | 7/2009 | Luo et al. |
| 2009/0248661 A1 | 10/2009 | Bilenko et al. |
| 2011/0219073 A1 | 9/2011 | Lawler et al. |
| 2011/0268369 A1 | 11/2011 | Richards et al. |

FOREIGN PATENT DOCUMENTS

| | | |
|---|---|---|
| JP | 11-265369 | 9/1999 |
| JP | 2002-132604 | 5/2002 |
| WO | WO 97/21183 | 6/1997 |
| WO | WO 00/68860 | 11/2000 |
| WO | WO 2004/111771 | 12/2004 |
| WO | WO 2006/121575 | 11/2006 |

OTHER PUBLICATIONS

R. Datta et al., "Image retrieval: Ideas, influences, and trends of the new age", *ACM Computing Surveys*, vol. 40, No. 2, 2008.

Smeulders et al., "Content-based image retrieval at the end of the early years", *IEEE Transactions on Pattern Analysis and Machine Intelligence (TPAMI)*, vol. 22, No. 12, pp. 1349-1380, 2000.

Ma et al., "A toolbox for navigating large image databases", *Multimedia System*, vol. 3, No. 7, pp. 184-198, 1999.

Joshi et al., "The story picturing engine—a system for automatic text illustration", *ACM Transactions on Multimedia, Computing, Communications and Applications*, vol. 2, No. 1, pp. 68-89, 2006.

Fergus et al., "A visual category filter for Google images," in *Proc. 8th European Conference on Computer Vision (ECCV)*, pp. 242-256, 2004.

Fergus et al., "Object class recognition by unsupervised scale-invarint learning" in *Proc. Conference on Computer Vision and Pattern Recognition (CVPR)*, vol. 2, pp. 264-271, 2003.

Friedman et al., Bayesian network classifiers *Machine Learning*, vol. 29, pp. 131-163, 1997.

D.G. Lowe, "Distinctive Image Features from Scale-Invariant Keypoints", *International Journal of Computer Vision (IJCV)*, vol. 60, No, 2, pp. 91-110, 2004.

Xing et al., "Distance metric learning, with applications to clustering with side-information", in *Proc. 15th Conference on Advances in Neural Information Processing Systems (NIPS)*, vol. 15, pp. 450-459, 2002.

Weinberger et al., "Distance metric learning for large margin nearest neighbor classification", in *Proc. 18th Conference on Advances in Neural Information Processing Systems (NIPS)*, vol. 18, pp. 1437-1480, 2006.

Frome et al., "Learning globally-consistent local distance functions for shape-based image retrieval and classification", in *Proc. 11th IEEE International Conference on Computer Vision (ICCV)*, pp. 1-8, 2007.

Simon et al., "Scene summarization for online image collections", in *Proc. 12th International Conference on Computer Vision (ICCV)*, 2007.

Baluja et al., Video suggestion and discover for YouTube: Taking random walks through the view graph:, in *Proc. 17th International World Wide Web Conference (WWW)*, 2008 to appear.

Hsu et al., "Video search reranking through random walk over document-level context graph" in *Proc. 15th International Conference on Multimedia*, pp. 971-980, 2007.

J.M. Kleinberg, "Authoritative sources in a hyperlinked environment", *Journal of the ACM*, vol, 46, No. 5, pp. 604-632, 1999.

Frey et al., "clustering by passing messages between data points", *Science*, vol. 315, pp. 972-276, 2007.

Kondor et al., "Diffusion kernels on graphs and other discrete structures", in *Proc. 19th International Conference on Machine Learning (ICML)*, pp. 315-322, 2002.

Jing et al., "Canonical image selection from the web", in *Proc. 6th International Conference on Image and Video Retrieval (CIVR)*, pp. 280-287, 2007.

Harris et al., "A combine corner and edge detector", in *Proc. 4th Alvey Vision Conference*, pp. 147-151, 1988.

Belongie et al, "Shape matching and object recognition using shape contexts", *IEEE Transactions on Pattern Analysis and Machine Intelligence (TPAMI)*, vol. 24, No. 24, pp. 509-522, 2002.

Lazebnik et al., A sparse texture representation using affine-invariant regions, in *Proc. Conference on Computer Vision and Pattern Recognition (CVPR)*, vol. 2, pp. 319-324, 2003.

Mikolajczyk et al., "A performance evaluation of local descriptors", *IEEE Transactions on Pattern Analysis and Machine Intelligence (TPAMI)*, vol. 27, No. 10, pp. 1615-1630, 2005.

Winder et al., "Learning local image descriptors", in *Prof Conference on Computer Vision and Pattern Recognition (CVPR)*, 2007.

Bay et al., "surf: Speeded up robust features", in *Proc. 9th International European Conference on Computer Vision (ECCV)*, pp. 404-417, 2006.

Nister et al., "Scalable recognition with a vocabulary tree", in *Proc. Conference on Computer vision and Pattern Recognition (CVPR)*, vol. 2, pp. 2161-2168, 2006.

Ke et al., "Efficient near-duplicate detection and sub-image retrieval", in *Proc. ACM International Conference on Multimedia (ACM MM)*, pp. 869-876, 2004.

Ke et al., "Pca-sift: A more distinctive representation for local image descriptors", in *Proc. Conference on Computer Vision and Pattern Recognition (DVPR)*, vol. 2, pp. 506-516, 2004.

Nowak et al., "Learning visual similarity measures for comparing never seen objects", in *Proc. Conference on Computer Vision and Pattern Recognition (CVPR)*, 2007.

Philbin et al., "Object retrieval with large vocabularies and fast spatial matching", in *Proc. Conference on Computer Vision and Pattern Recognition (CVPR)*, 2007.

Datar et al., Locality-sensitive hashing scheme based on p-stable distributions:, in *Proc. 20th Symposium on Computational Geometry (SCG)*, pp. 253-262, 2004.

"Mining the Web's Link Structure" by Chakrabarti et al., for *IEEE Computer* Magazine, Aug. 1999, pp. 60-67.

"Text Categorization and Support Vector Machines" by Pilaszy, for *Computer Science*, vol. 1398, 1998, 10 pages.

"Machine Learning in Automated Text Categorization" by Sebastiani, for *ACM Computing Surveys*, vol. 34, No. 1, Mar. 2002, pp. 1-47.

"The Anatomy of a Large-Scale Hypertextual Web Search Engine" by Brin et al., for *Computer Networks*, 1998, pp. 1-26.

"The Web as a graph: measurements, models, and methods" by Kleinberg et al., for *Proceedings of the International Conference on Combinatronics*, 1999, 18 pages.

"Topic-Sensitive PageRank" by Haveliwala et al., for *IEEE Transactions on Knowledge and Data Engineering*, 2003, 10 pages.

"Evaluating Collaborative Filtering Recommender Systems" by Herlocker et al., for *ACM Transactions on Information Systems*, vol. 22, No. 1, Jan. 2004, pp. 5-53.

"Applying Collaborative Filtering to Usenet News" by Konstan et al., for *Communications of the ACM*, Mar. 1997, vol. 40, No. 3, pp. 77-87.

"A Comparative Study on Feature selection and Classification methods Using Gene Expression Profiles and Proteomic Patterns" by Liu et al., for *Genome Informatics* 13:, pp. 51-60, 2002.

'Facebook unveils school-specific advertisements' [online]. The Stanford Daily, 2005, [retrieved on Jun. 14, 2006]. Retrieved from the Internet: <URL: www.daily.stanford.edu/tempo?page=content&id=15553&repository=0001_article>, 3 pages.

Carson et al., "Blob-world: image segmentation using expectation-maximization and its application to image querying", *IEEE transactions on Pattern Analysis and Machine Intelligence (TPAMI)*, vol. 24, No. 8, pp. 1026-1038, 2002.

He et al., "Imagerank: spectral techniques for structural analysis of image database", in *Proc. International Conference on Multimedia and Expo*, vol. 1, pp. 25-28, 2002.

Indyk et al., "Approximate nearest neighbor-towards removing the curse of dimensionality", in *Proc. 30th ACM Symp. On Computational Theory*, pp. 604-613, 1998.

Park et al., "Majority based ranking approach in web image retrieval", *Lecture Notes in Computer Science*, vol. 27-28, pp. 499-504, 2003.

Pentland et al., "Content-based manipulation of image databases", *International Journal of Computer Vision (IJCV)*, vol. 18, No. 3, pp. 233-254, 1996.

Schindler et al., "city-scale location recognition", in *Proc. Conference on Computer Vision and Pattern Recognition (CVPR)*, 2007.

Uchihashi et al., "Content-free image retrieval by combinations of keywords and user feedbacks", in *Proc. 5th International Conference on Image and Video Retrieval (CIVR)*, pp. 650-659, 2005.

U.S. Appl. No. 95/001,061, Reexam of Stone.
U.S. Appl. No. 95/001,068, Reexam of Stone.
U.S. Appl. No. 95/001,069, Reexam of Stone.
U.S. Appl. No. 95/001,073, Reexam of Stone.

Accounts, at http://www.cs.rice.edu/~ssiyer/accounts/, as available via the Internet and printed on Jul. 29, 2004.

Adamic et al., "A Social Network Caught in the Web," at http://firstmonday.org/issues/issue8_6/adamic/, as available via the Internet and printed on Jul. 28, 2004.

AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
AdStar.com website archive from www.Archive.org, Apr. 12, 1997, and Feb. 1, 1997.

Amazon.com, "Selling at Amazon Marketplace," at http://pages.amazon.com/exec/obidos/tg/browse/-/1161234/ref=hp_hp_is_4_2/002-283572 as available via the Internet and printed on Jul. 29, 2004.

Amazon.com, "New Seller FAQ," at http://pages.amazon.com/exec/obidos/tg/browse/-/1161274/002-2835726-5513622 as available via the Internet and printed on Jul. 29, 2004.

Azran, "The Rendezvous Algorithm: Multiclass Semi-Supervised Learning with Markov Random Walks," *ICML*, 2007, 8 pages.

Baluja and Rowley, *Intl J Computer Vision*, 2007, 71(1): at http://portal.acm.org/toc.cfm?id=J325&type=periodical&coll=&dl=ACM&CFID=15151515&CFTOKEN=6184618.

Baseview Products, Inc., AdManager Pro Administrator's Manual v. 2.0, Jun. 1998.

Baseview Products, Inc., ClassManagerPro Administration and Receivables Manual v. 1.0.5, Feb. 1, 1997.

Boccaletti et al., "Complex Networks: Structure and Dynamics," *Physics Reports*, 2006, 424:175-308.

Business Wire, "Global Network, Inc. Enters Into agreement in Principle with Major Advertising Agency," Oct. 4, 1999.

Dalal and Triggs, "Histograms of Oriented Gradients for Human Detection," *Proc IEEE Conf Computer Vision and Pattern Recognition*, Jun. 2005, pp. 886-893.

Dedrick, Interactive Electronic Advertising, IEEE, 1994, pp. 55-66.
Dedrick, A Consumption Model for Targeted Electronic Advertising, Intel Architecture Labs, IEEE, 1995, pp. 41-49.

Dellaert et al., "Mixture Trees for Modeling and Fast Conditional Sampling with Applications in Vision and Graphics," *Proc IEEE Conf Computer Vision and Pattern Recognition*, 2005 at http://www.cs.unc.edu/~kwatra/publications/cvpr05-mixtree.pdf.

Doctorow, "Running Notes from Revenge of the User: Lessons from Creator/User Battles," at http://craphound.com/danahetcon04.txt, as available via the Internet and printed Jul. 28, 2004.

Ebay.com, "What is eBay?" at http://pages.ebay.com/help/welcome/questions/about-ebay.html as available via the Internet and printed on Jul. 29, 2004.

Ebay.com, "How to Bid," at http://pages.ebay.com/help/welcome/bid.html as available via the Internet and printed on Jul. 29, 2004.

Ebay.com, "How to Sell," at http://pages.ebay.com/help/welcome/sell.html as available via the Internet and printed on Jul. 29, 2004.

Gibson et al., "Inferring Web Communities from Link Topology," *Proc 9th ACM Conference on Hypertex and Hypermedia*, 1998, 10 pages.

Gionis et al., "Similarity Search in High Dimensions via Hashing," *Proc 25th Very Large Database Conf*, 1999 at people.csail.mit.edu/indyk/vldb99.ps.

Glance et al., "Knowledge Pump: Supporting the Flow and Use of Knowledge," *Information Technology for Knowledge Management*, 1997, Borghoff and Pareschi (eds.), Springer Verlag, 22 pages.

Grauman and Darrell, "The Pyramid Match Kernel: Discriminative Classification with Sets of Image Features," *ICCV 2005* at http://people.csail.mit.edu/kgrauman/jobapp/kgrauman_sample_papers.pdf.

Information Access Technologies, Inc., Aaddzz brochure, "The best Way to Buy and Sell Web Advertising Space," 1997.

Information Access Technologies, Inc., Aaddzz.com website archive from www.Archive.org, archived on Jan. 30, 1998.

Jeh and Widom, "SimRank: A Measure of Structural-Context Similarity," *Proc 8th ACM SIGKDD international conference on knowledge discovery and data mining*, Jul. 2002, pp. 538-543.

Joachims, "Text Categorization with Support Vector Machines: Learning with Many Relevant Features," *Proc 10th European Conf on Machine Learning*, 1998, pp. 137-142.

Kautz et al., "ReferralWeb: Combining Social Networks and Collaborative Filtering," *Communications of the ACM*, 1997, 40(3):1-4.

Leigh et al., "Transformation, Ranking, and Clustering for Face Recognition Algorithm Comparison," at http://www.itl.nist.gov/div898/itperf/renorm.pdf, 2002.

Liu et al., "An Investigation of Practical Approximate Nearest Neighbor Algorithms," *Proc Neural Information Processing Systems*, 2004 at http://www.cs.cmu.edu/~tingliu/research.htm.

Microsoft Corporation, "Is Friendster the 'Next Big Thing'?" at http://mobilemomentum.msn.com/article.aspx?aid=4, as available via the Internet and printed on Jul. 29, 2004.

Multiply, "About Multiply," at http://multiply.com/info/about, as available via the Internet and printed on May 3, 2004.

Multiply, "Help," at http://multiply.com/info/help, as available via the Internet and printed on May 3, 2004.

Multiply, "Multiply Privacy Policy," at http://multiply.com/info/privacy, as available via the Internet and printed on May 3, 2004.

Multiply, "Multiply Terms of Service," at http://multiply.com/info/tos, as available via the Internet and printed on May 3, 2004.

Roach et al., "Video Genre Classification Using Dynamics," 2001, *Proc Acoustics, Speech, and Signal Processing on IEEE Intl Conference*, pp. 1557-1560.

Rothganger et al., "3D Object Modeling and Recognition Using Affine-Invariant Patches and Multi-View Spatial Constraints," *CVPR 2003*, at http://vasc.ri.cmu.edu/~hebert/04AP/fred_cypr03.pdf.

Rowley et al., "Neural Network-Based Face Detection," *IEEE Transactions on Pattern Analysis and Machine Intelligence*, 1998, 20(1).

Sullivan, Danny, "Is It Really Personalized Search?" http://searchenginewatch.com printed on May 13, 2004.

Szummer and Jaakkola, "Partially labeled classification with Markov random walks," *NIPS 2001*.

Tribe.net, "Listings Directory," at http://www.tribe.net/tribe/servlet/template/pub.Listings.vm, as available via the Internet and printed on Jun. 28, 2004.

Viola and Jones, "Robust Real Time Face Detection," *Int J Computer Vision*, 2004 at , http://scholar.googie.com/scholar?hl=en&lr=&cluster=10098362814192689387.

Wang et al., "AnnoSearch: Image Auto-Annotation by Search," *CVPR 2006*.

Yang et al., "Mining Social Networks for Targeted Advertising," *Proceedings of the 39th Hawaii International Conference on System Sciences*, 2006.

Yang and Pedersen, "A Comparative Study on Feature Selection in Text Categorization Source," *Proc 14th Intl Conf Machine Learning*, 1997, pp. 412-420.

Zeff et al., *Advertising on the Internet*, 2nd ed., John Wiley & Sons, 1999.

Zhou and Schölkopf, "Learning from Labeled and Unlabeled Data Using Random Walks," *Lecture notes in computer science*, 2004, Springer, 8 pages.

Zhu et al., "Semi-Supervised Learning Using Gaussian Fields and Harmonic Functions," *Proc. 20th Intl Conf on Machine Learning*, 2003, 8 pages.

Zhu, "Semi-Supervised Learning with Graphs," 2005, Doctoral Thesis, Carnegie Mellon University, 174 pages.

International Search Report/Written Opinion in PCT/US2008/062263 mailed Jan. 1, 2008, 13 pages.

International Preliminary Report on Patentability in PCT/US2008/062263 mailed Nov. 12, 2009, 7 pages.

International Search Report/Written Opinion in PCT/US2008/62285 mailed Dec. 5, 2008, 12 pages.

International Preliminary Report on Patentability in PCT/US2008/62285 mailed Nov. 12, 2009, 8 pages.

Liew, et al., "Social Networks," U.S. Appl. No. 60/552,718, filed Mar. 15, 2004, 9 pages.

P. Indyk, "Stable Distributions, Pseudorandom Generators, Embeddings, and Data Stream Computation", in *Proc. 41st IEEE Symposium on Foundations of Computer Science (FOCS)*, pp. 189-197, 2000.

Jing et al., "VisualRank: Applying PageRank to Large-Scale Image Search," *IEEE Transaction on Pattern Analysis and Machine Intelligence*, vol. 30, No. 11, Nov. 2008, pp. 1877-1890.

Lowe, "Local Feature View Clustering for 3D Object Recognition," *CVPR 2001*, at http:/www.cs.ubc.ca/~lowe/papers/cvpr01.pdf.

Press Releases Facebook Leading Websites Offer Facebook Beacon for Social Distribution [online] [retrieved from the internet: http://www.facebook.com/press/releases.php?p9166] [retrieved on Jan. 24, 2008], 1 page.

\* cited by examiner

ASSOCIATION OF TERMS WITH IMAGES USING IMAGE SIMILARITY

BACKGROUND

This specification relates to image annotation.

Image search engines have become a popular tool on the Internet. These search engines help users find images that match their criteria. Some of these search engines index images by keywords or labels. Such image search engines retrieve images by matching users' search queries against these keywords or labels.

The keywords or labels for indexing an image can be drawn from text surrounding the image in a webpage or other text associated with the image (e.g., the filename of the image), for example. The keywords or labels can provide some indication of the content of an image. For example, an image of a horse can be associated with the keyword "horse." In some cases, the keywords for an image that are extracted from the text may not be informative or useful. For example, words such as "cool" and "wow" generally are not very informative about the content of an image. Poorly labeled images can degrade the quality of an image search result.

SUMMARY

In general, one aspect of the subject matter described in this specification can be embodied in methods that include the actions of receiving a plurality of images, where one or more of the images are associated with one or more terms; determining degrees of similarity between a plurality of pairs of images in the plurality of images; assigning to one or more of the terms a respective weight with respect to a first image of the plurality of images based at least on the degrees of similarity; and selecting one or more of the terms based on the respective weights of the terms with respect to the first image and associating the selected terms with the respective image. Other embodiments of this aspect include corresponding systems, apparatus, and computer program products.

In general, another aspect of the subject matter described in this specification can be embodied in methods that include the actions of receiving a plurality of images, where one or more terms are associated with one or more of the images; determining degrees of similarity between a plurality of pairs of images in the plurality of images; generating a weighted graph data structure, where the weighted graph data structure has nodes corresponding to the images and an edge connecting a first node and a second node of the weighted graph data structure has a weight based on a degree of similarity between an image corresponding to the first node and an image corresponding to the second node; propagating the terms to the nodes of the weighted graph data structure based on the weighted edges; and selecting one or more terms for a respective image of the plurality of images based on the propagating and associating the selected terms with the respective image. Other embodiments of this aspect include corresponding systems, apparatus, and computer program products.

In general, another aspect of the subject matter described in this specification can be embodied in methods that include the actions of identifying similarities between features of images in a set of images, where the images are associated with one or more terms; representing the similarities in a similarity graph; and using the similarity graph to identify a set of terms for an image search query that will produce a search result that includes similar images. Other embodiments of this aspect include corresponding systems, apparatus, and computer program products.

Particular embodiments of the subject matter described in this specification can be implemented to realize one or more of the following advantages. Images can be associated with one or more terms based on the associations between the terms and similar images. The most relevant term for an image can be identified. Uninformative or unrelated terms for an image can be identified and disassociated from the image. Respective weights can be assigned to terms with respect to an image. The weights assigned to terms can be used to find the best match between search query terms and images.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
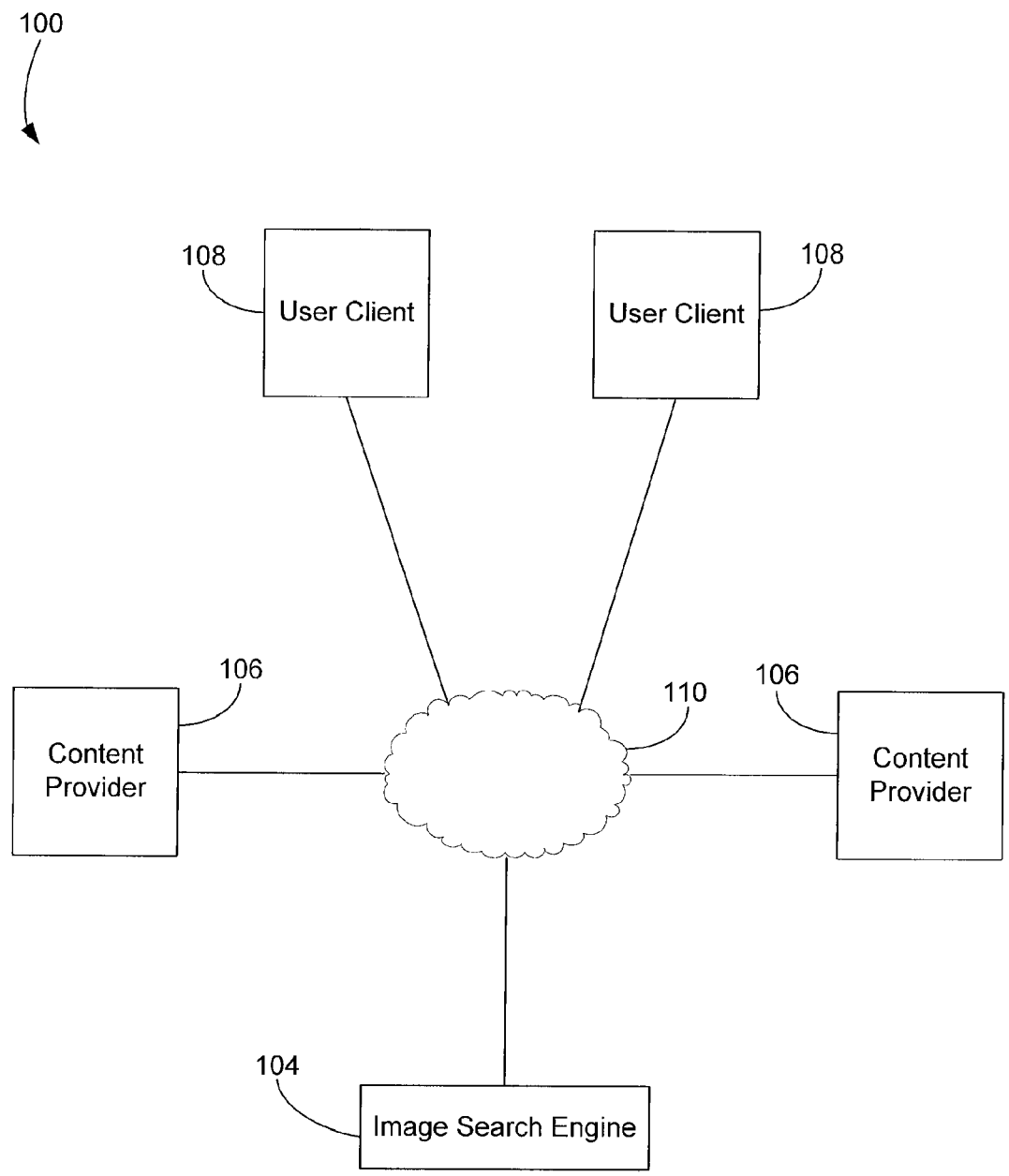
FIG. 1 is a block diagram illustrating an image search environment.

FIG. 1 illustrates an image search environment 100. The environment 100 includes a search engine 104, one or more content providers 106, and one or more user clients 108. These components can be communicatively coupled by one or more networks 110. The one or more networks 110 can include local area networks, wide area networks, wireless networks (e.g., Wi-Fi networks), mobile phone networks, and the Internet.

Content providers 106 host content. The hosted content can include text, images, audio, video, and so forth. In some implementations, the content host 106 hosts one or more images. An image hosted by the content host 106 can be downloaded by a user client 108 or pushed to the user client 108. The image may be downloaded or pushed with a webpage written in the Hypertext Markup Language (HTML) or any other suitable language for authoring webpages. In some implementations, content host 106 is a web server that hosts webpages and images.

The environment 100 includes one or more user clients 108. The user client 108 can include a desktop computer, laptop computer, a media player (e.g., an MP3 player, a streaming audio player, a streaming video player, a television, a computer, a mobile device, etc.), a mobile phone, a browser facility (e.g., a web browser application), an e-mail facility, or other device that can access content via network 110.

The content provider 106 may permit user client 108 to access images. In some implementations, a user at a user client 108 can access images at a content host 106 through a web browser application, for example.

An image search engine 104 indexes images, receives search queries for the images, and returns results in response to the queries. In some implementations, a crawler associated with the image search engine 104 crawls the content providers 106 for images and indexes the crawled images. In some implementations, the image search engine 104 stores copies of the crawled images. In some implementations, the image search engine 104 is a part of a search engine for various types of content (e.g., web pages, images, etc.).

The image search engine 104 can receive search queries for images from user clients 108. An image search query can include one or more terms, which can be words, phrases, numbers, and any combination thereof. In some implementations, a user at a user client 108 accesses a user interface of the image search engine 104 and enters a search query through, for example, a browser application at the user client 108. For an image search query, the image search engine 104 finds the indexed images that match the query, and returns the search results to a user client 108 for presentation to the user. The search results for an image search can include thumbnails of the images that match the query and hyperlinks to the images or webpages that include the images.

The image search engine 104 can index images based on one or more terms associated with the images. A term can be a word, phrase, number, or any combination thereof. An image matches an image search query if the query matches the terms associated with the image. One or more terms associated with an image can also be referred to as a "label."

In some implementations, the terms that are associated with an image are derived from a metadata of the image. For example, the metadata of a JPEG image file can include terms that indicate a title, a description, categories, keywords, and the like. In some implementations, the image metadata is data embedded in an image file in accordance with the Exchangeable Image File Format (Exif) specification. The image search engine 104 can read the metadata of the image, as well as the filename of the image, and extract terms from the metadata or the filename.

In some implementations, the terms that are associated with an image can be determined by the image search engine 104. The image search engine 104 can extract one or more terms associated with content related to the image and associate the terms with the image. For example, the image search engine 104 can extract terms from text from a webpage in which the image appears, anchor text of links to the image, text from a webpage to which the image links (if the image is an anchor for a hyperlink to the webpage), and so forth.

In some implementations, the image search engine 104 can determine which terms should be associated with an image based on user testing. For example, the image search engine 104 can show a population of users an image and ask the users to specify terms that come to mind when they see the image and optionally order them. The terms entered by the users provide an indication of what users believe the topics, concepts, or subject matter of the image are. The image search engine 104 can select the most popular of the user-specified terms to associate with the image.

Figure 2:
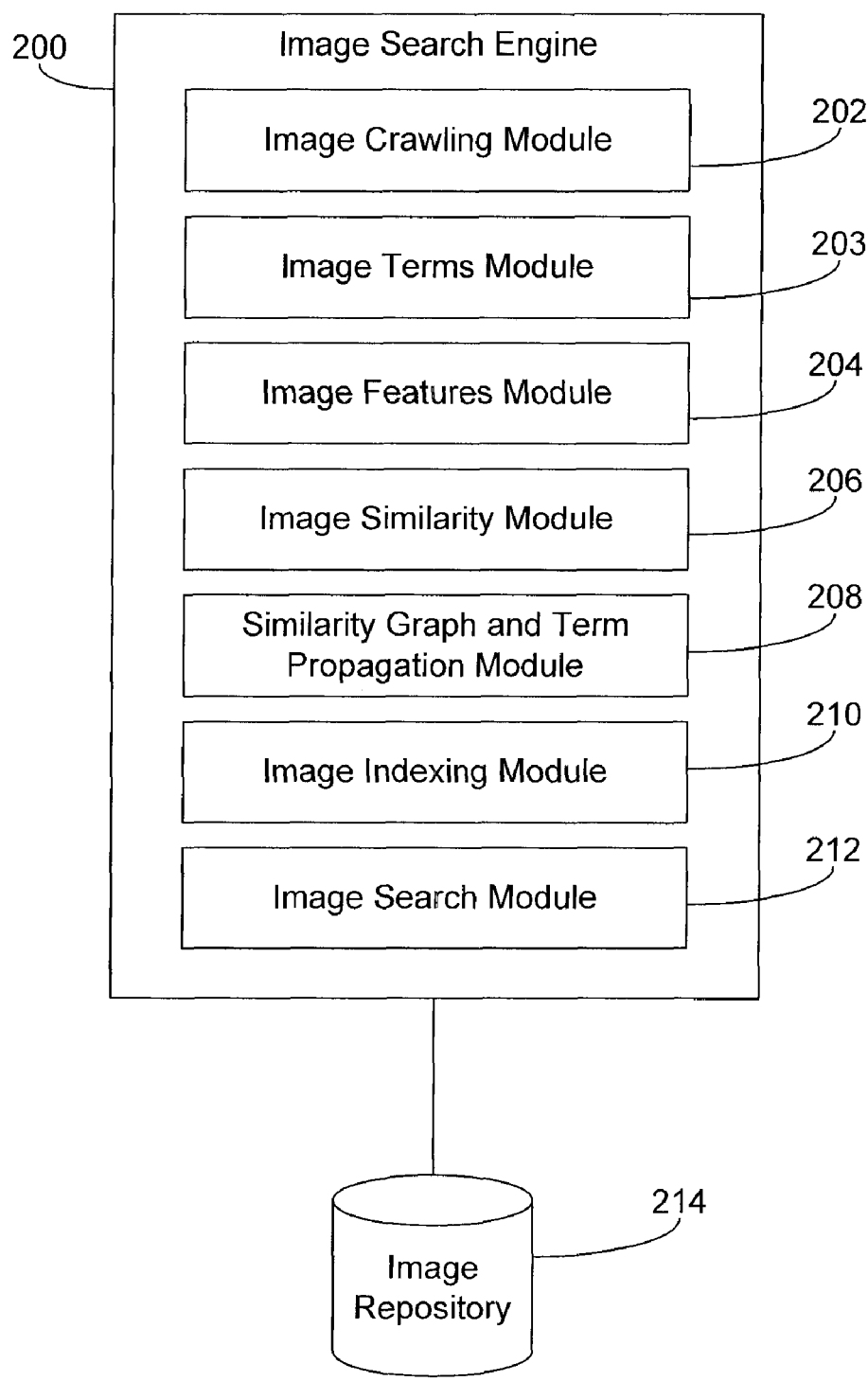
FIG. 2 is a block diagram illustrating an image search engine.

FIG. 2 is a block diagram illustrating an image search engine 200. The image search engine 200 includes an image crawling module 202, an image terms module 203, an image features module 204, an image similarity module 206, a similarity graph and term propagation module 208, an image indexing module 210, an image search module 212, and an image repository 214.

The image crawling module 202 crawls content providers 106 for images. The image crawling module 202 accesses content at the content providers 106 images and any other content associated with the images. The crawling module 202 receives copies of the crawled images (e.g., by downloading) and other content for further processing by the image search engine 200. In some implementations, the image crawling module 202 may be a more general crawling module that crawls for any content, not just images, hosted by content providers 106.

The image terms module 203 determines what terms are associated with an image. The image terms module 203 extracts terms from metadata associated with an image (e.g., filename, Exif metadata, etc.). The image terms module 203 can also determine the terms that should be associated with an image from other content associated with the image (e.g., a text of a webpage in which the image is associated, anchor text of hyperlinks to the image, text of a webpage to which the image links, etc.).

The image features module 204 identifies features of the images. The image features module 204 can determine, for an image, one or more features. The image similarity module 206 determines a degree of similarity for pairs of images. The image similarity module 206 compares, for any pair of images within a repository or set of images, the features of the images in the pair, as identified by the image features module 204, and determines a value representing a degree of similarity between the two images in the pair. Further details regarding the identification of features and the determination of the degree of similarity are described below.

The image similarity graph and term propagation module 208 generates a similarity graph of the images and propagates terms associated with images using the graph. A similarity graph, as described in this application, is a weighted graph where each node corresponds to an image, and edges between nodes are weighted by the degree of similarity between the images corresponding to the connected nodes. Terms associated with images can be propagated to other images using a similarity graph, further details of which are described below in reference to FIGS. 3-6.

Image indexing module 210 indexes images according to the terms associated with an image. The indexing enables searching of the images by terms.

The image search module 212 processes search queries for images and returns search results in response to the queries. A search query for images can include one or more terms. The image search module 212 receives a query (from user client 108, for example), finds images (e.g., images from image repository 214) that are associated with terms that match the terms of the search query, and returns the search results. In some implementations, the search results are returned in a webpage that shows thumbnails of the matching images and information related to the images (e.g., image file size and file type, image dimensions, domain in which the image is located, etc.)

Information regarding the images crawled by the image crawling module 202, and optionally copies of the crawled images, can be stored in an image repository 214. In some implementations, the image repository 214 is a database (e.g., a MySQL® database) of images and image information. The image repository 214 also stores an index of images that have been crawled or received by the image search engine 200. A copy of an image does not have to be stored at the image repository 214 to be in the index.

Figure 3:
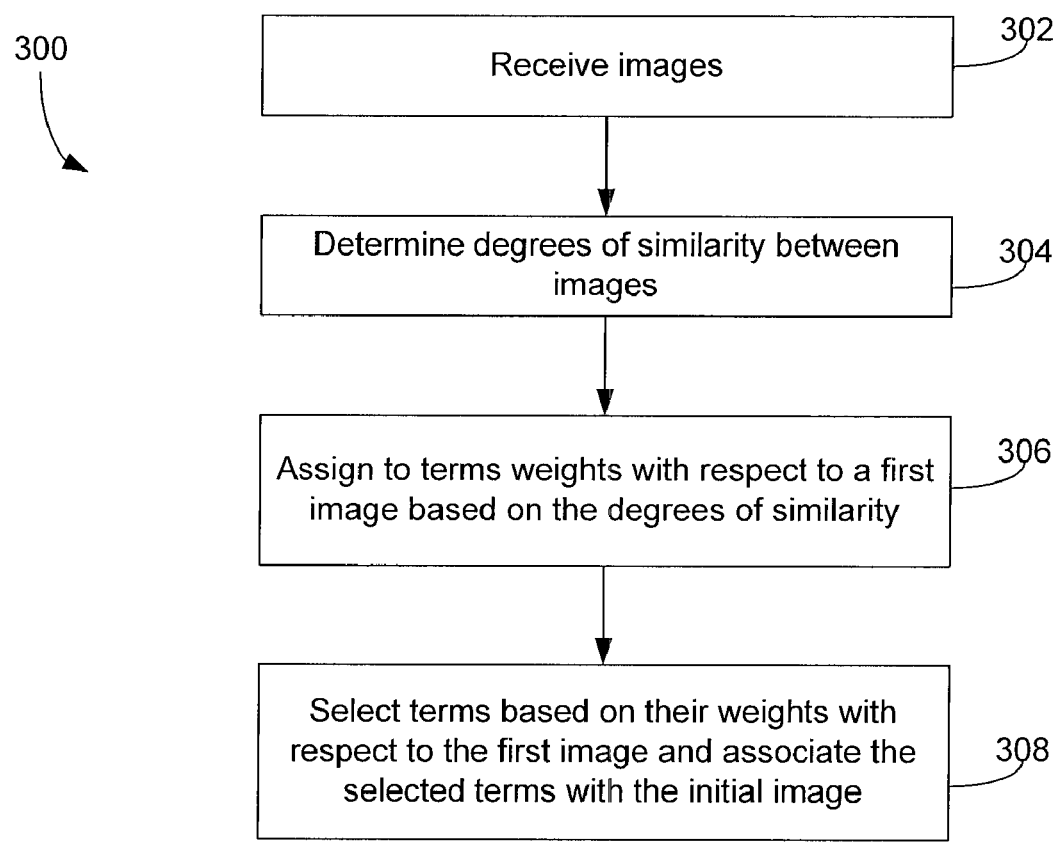
FIG. 3 is a flow diagram illustrating an example process for associating terms with an image.

FIG. 3 is a flow diagram illustrating an example process 300 for associating terms with an image. For convenience, the process 300 will be described with reference to a system (e.g., image search engine 200) that performs the process.

Multiple images are received (302). In some implementations, the images can be received as part of a crawl of content providers hosting the images. In some other implementations, the images can be received from an upload of images to the system. In some implementations, content associated with the images (e.g., webpages in which the images are located) are received as well. These received images are eventually indexed by the image indexing module 210.

A received image can be associated with one or more terms. For example, the image search engine can read the metadata of the image (e.g., filename, Exif data, etc.) for an image and extract any title, description, category, keyword, or other terms from the metadata and associate the terms with the image. As another example, terms that can be associated with the image can be determined from other content associated with the image (e.g., webpage in which the image is located, anchor text of hyperlink to the image, etc.). Any number of the images can be associated with a particular term, and an image can be associated with multiple terms.

In some implementations, the terms can be extracted from the metadata or other content associated with the image, without any discrimination as to whether a term is useful. In some other implementations, an importance or relevance metric can be determined for terms, and terms with values for the metric that are above a threshold or satisfy some criterion are selected and associated with the image. In an exemplary implementation, the importance or relevance metric is the well-known term frequency-inverse document frequency (TF-IDF) of the term. For example, say that an image is included in a webpage that includes terms X and Y. If term X has a TF-IDF with respect to the webpage that is above a predefined threshold and the TF-IDF for term Y is not above the threshold, then term X, and not term Y, is associated with the image. Using the TF-IDF as an importance or relevance metric can be useful for removing relatively uninformative terms (e.g., "a," "the," prepositions, etc.) from consideration.

In some implementations, degrees of similarity are determined for pairs of images (304). That is, an image can be paired with one or more of the other images, and for each pair, a degree of similarity between the image pair can be determined.

Figure 4:
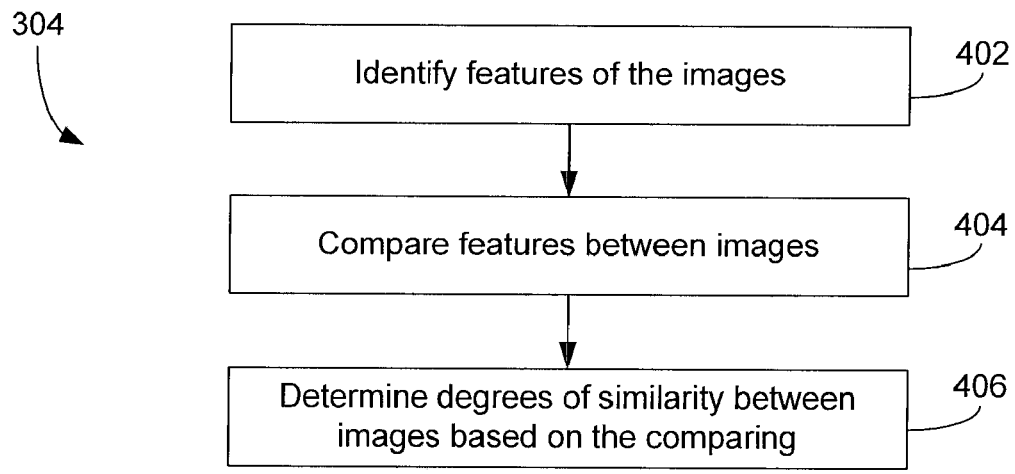
FIG. 4 is a flow diagram illustrating an example process for determining image similarities.

FIG. 4 illustrates block 304 in further detail. For convenience, FIG. 4 will be described with respect to a pair of images "Image A" and "Image B." However, the described process can be performed on any pairing of images, and thus degrees of similarities can be determined for any number of pairs of images in the received set of images.

One or more global and/or local features of Image A and one or more global and/or local features of Image B are identified (402). Examples of image features that may be used include image features based on, for example, intensity, color, edges, texture, wavelet based techniques, or other aspects of the image. For example, regarding intensity, each image may be divided into small patches (e.g., rectangles, circles, etc.) and an intensity histogram computed for each patch. Each intensity histogram may be used as a feature for the image. Similarly, as an example of a color-based feature, a color histogram may be computed for each patch (or for different patches) within each image. A color histogram can be similarly computed to obtain a color-based histogram. The color histogram may be calculated using any color space, e.g., the RGB (red, green, blue) color space, YIQ (luma and chrominance), or another color space.

Histograms can also be used to represent edge and texture information. For example, histograms can be computed based on patches of edge information or texture information in an image. For wavelet based techniques, a wavelet transform may be computed for each patch and used as an image feature.

The features discussed above represent an exemplary list of possible image features that may be used for determining similarities between images. Other image features may be used. In an exemplary implementation, the features are identified using the known scale-invariant feature transform (SIFT). An examples of the SIFT technique is described in Lowe, "Distinctive Image Features from Scale-Invariant Keypoints," *International Journal of Computer Vision*, Vol. 60, Issue 2 (2004), pp. 91-110, which is incorporated by reference herein in its entirety.

In some implementations, a global feature is a feature that is identified for the image as a whole. For example, a color or intensity histogram of the entire image is a global feature. A local feature is a feature that is identified for a portion of the image. For example, a color or intensity histogram of a patch in the image is a local feature.

In some implementations, to improve computation efficiency, features may be computed only for certain areas within images. For example, "objects of interest" within an image may be determined and image features may only be computed for the objects of interest. For example, if the image feature being used is a color histogram, a histogram may be computed for each patch in the image that includes an object of interest. Objects of interest within an image can be determined in a number of ways. For example, for color, objects of interest may be defined as points where there is high variation in color (i.e., areas where color changes significantly). Objects of interest can be determined mathematically in a variety of ways and can be based on determining discontinuities or differences from surrounding points. In some implementations, the objects of interest are determined based on points of interest (or "keypoints") identified in the image. The SIFT technique is an example of one technique for locating keypoints and objects of interest and features for these keypoints. In other words, the computed image features are local features local to the keypoints or objects of interest.

In some implementations, a feature identified for a keypoint include a position (e.g., X-Y coordinates of the image, orientation, and scale (e.g., radius of a patch centered on the keypoint). When these image features are compared for a pair of images, as described below, the orientations and scales of the features can be compared as a geometrical verification between the two images in the pair.

As an example of the use of keypoints, say that Image A is an image of the Eiffel Tower, where the Eiffel Tower takes up a large portion of the image, and that Image B is an image of a tourist with the Eiffel Tower in the background, where the Eiffel Tower takes up a small portion of the image. Using keypoint identification, points on the Eiffel Tower in Image A and on the Eiffel Tower in Image B can be identified as keypoints. The comparison of these features may indicate that Image B contains an object (Eiffel Tower) that is in Image A, and vice versa.

Additionally, in some implementations, the various features described above may be computed using different image scales. For example, an image can be examined and features computed in its original scale and then features may be successively examined at smaller scales. Additionally or alternatively, features may be selected as features that are scale invariant or invariant to affine transformations. The SIFT techniques, for example, can be used to extract distinctive invariant objects from images. The extracted objects are invariant to image scale and rotation.

The identified features are compared; the features of Image A are compared to the corresponding features of Image B (404). A degree of similarity (or a "similarity score") between Image A and Image B is determined based on the comparison (406). For each feature that is to be used, a comparison function may be selected. A number of different comparison functions may be used to compare images. The particular comparison function to use may be decided ahead of time or offline by an administrator. The output of the comparison function can be used to determine the similarity. For example, the similarity can be a linear combination of the outputs of the comparison functions.

In general, a comparison function may operate to generate a value defining a similarity between a particular feature computed for two images. As an example of a possible comparison function, consider a simple histogram comparison function, which is described in pseudo-code in Table I, below. As shown in Table I, the histogram comparison function returns a value that is the sum of the absolute values of the differences between corresponding bins in the input histograms. Smaller values returned from this function indicate greater similarity between the input histograms.

TABLE I

```
Compare_histogram_type_features(histogram1,histogram2)
    Difference = 0;
    For all bins, b, in histogram:
        Difference = Difference + |histogram1[b] − histogram2[b]|
    Return(Difference)
```

The histogram comparison function of Table I is exemplary. It can be appreciated that other comparison functions can be used to compare histograms. For example, squared differences may be used rather than absolute differences, bin correlations may be taken into account instead of absolute differences, or percent differences may be used instead of absolute differences. Additionally, for image features other than those based on histograms, different comparison functions may be used.

The selection of the image features to use and the comparison functions to use may be performed offline or in non-realtime operation. For example, an administrator may initially design or configure image features module 204 and image similarity module 206 to use one or more image features and one or more comparison functions. After these initial acts, image features module 204 and image similarity module 206 may function in a realtime mode to determine pairwise degrees of similarity for a set of input images, such as images received from a crawl by image crawling module 202.

In some implementations, the similarity between Image A and Image B is a linear combination of scores from comparisons between corresponding features of Image A and Image B. An example implementation is shown in pseudo-code in Table II, below.

TABLE II

```
image_similarity_score = 0
For each feature F_A of image A:
    For each feature F_B of image B that is of type F_A (where B is not A)
        feature_similarity_score = compare_features(F_A, F_B)
        image_similarity_score = image_similarity_score +
        feature_similarity_score
```

In the implementation shown in Table II, each feature $F_A$ of Image A is compared with every feature $F_B$ of Image B that is the same feature type. In other words, if $F_A$ is a color histogram then the comparison is performed with the color histogram features of Image B, if $F_A$ is an edge histogram then the edge histogram features of Image B are compared, etc.

In the operation shown in Table II, each image feature is weighted equally. In some implementations, different features may be weighted differently. For example, color-based features may be less important than intensity or edge-based features. Accordingly, a features similarity score may be multiplied by a weight that reflects the importance of the particular feature.

In some other implementations, the degree of similarity between two images is calculated as the number of shared keypoints (i.e., keypoints whose feature(s) match) divided by the total number of keypoints.

The operation shown in Table II can be relatively computationally expensive if repeated for many images, as it requires $N^2$ comparisons for a set of N images, and for each comparison, $M_i * M_j$ feature comparisons, for $M_i$ and $M_j$ local features in each image. Techniques are known that may potentially accelerate this type of operation. For example, one such technique is described in Grauman et al., "The Pyramid Match Kernel: Discriminative Classification with Sets of Image Features," Tenth IEEE International Conference on Computer Vision (October 2005), Vol. 2, pp. 1458-1465.

FIG. 4 was described with respect to a single pair of images, Image A and Image B. The process described can be repeated for any number of unique pairs of images amongst a set of multiple images, where each image in the set can be paired with each other image in the set. In some implementations, for a set of images, a degree of similarity can be determined for each unique pair of images among the set. In some other implementations, degrees of similarity can be calculated for a subset of all of the unique pairs of images in the set of images. In an example implementation, the image pairs for which a degree of similarity is to be calculated can be a random sample of all of the unique pairs of images in the set; the degrees of similarity for the rest of the pairs can be approximated by other less computationally expensive metrics (e.g., a shortest path between two nodes, in an image similarity graph (e.g., similarity graph 600 (FIG. 6)), corresponding to the respective images in a pair, etc.).

Returning to FIG. 3, weights with respect to an image of the image set are assigned to the terms (306). The weights are assigned based at least on the degrees of similarity as described in reference to block 304.

Figure 5:
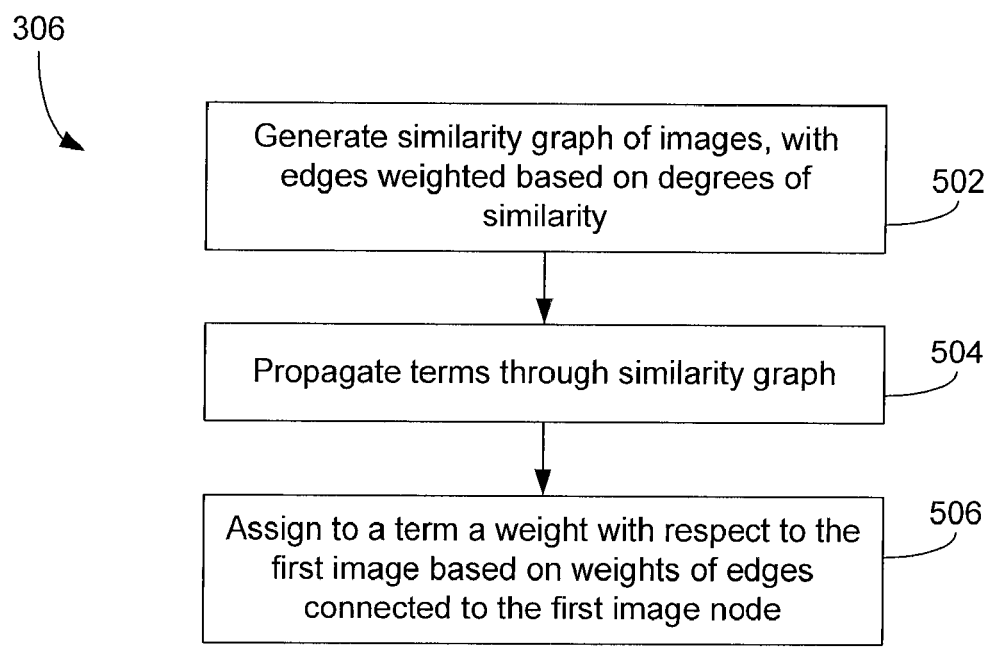
FIG. 5 is a flow diagram illustrating an example process for assigning weights to terms.

In some implementations, the assigning of the weights to the terms is performed using a similarity graph data structure. FIG. 5 illustrates block 306 in further detail. For convenience, FIG. 5 is described with respect to an exemplary Image A in a set of exemplary Images A-E, as described in reference to FIG. 6.

An image similarity graph data structure is generated (502). The image similarity graph includes a node for each image in a set of images (e.g., the images received by the image search engine 200). In some implementations, the image similarity graph is weighted; an edge in the graph is associated with a weight. An edge connecting two nodes in the similarity graph is weighted based on the degree of similarity between the images corresponding to the connected nodes. In some implementations, the edge weight is the degree of similarity (or similarity score) as determined in block 304. In some other implementations, the edge weight is a function of the degree of similarity. In some implementations, the graph includes "injector" nodes which act as the term nodes; the terms initially associated with the images are initially associated with the injector nodes in the graph rather than the image nodes. The graph can be generated by the system to include image nodes and injector nodes. In some other implementations, if an image is associated with one or more terms, the corresponding node is associated with the terms. Additionally, a term associated with a node can have a weight with respect to the node.

Figure 6:
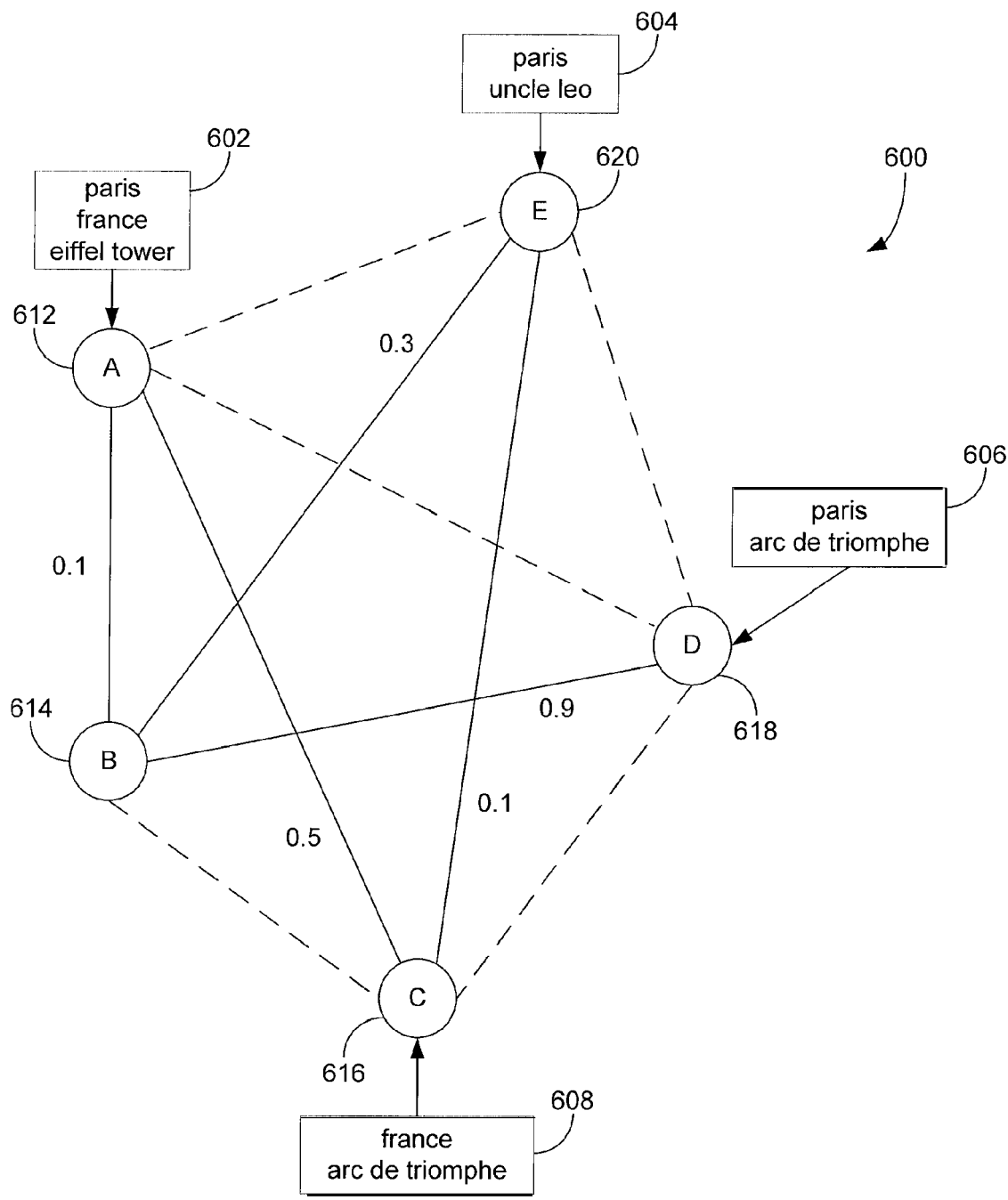
FIG. 6 is a diagram illustrating an example image similarity graph.

An example similarity graph is shown in FIG. 6. The similarity graph 600 includes nodes A, B, C, D, and E, corresponding to images A, B, C, D, and E, respectively. The graph also includes injector nodes 602, 604, 606, and 608. The graph includes edges between some pairs of the nodes. For example, the edge connecting A and B has a weight of 0.1; the degree of similarity between Image A and Image B is 0.1. As another example, the edge connecting B and D has a weight of 0.9; the degree of similarity between Image D and Image B is 0.9.

Terms are propagated through the similarity graph (504). A term associated with one node is propagated to another node in the similarity graph. In some implementations, as terms propagate through the similarity graph, a term weight is adjusted by the weight of the edge through which the term is propagated. For example, in the graph 600, an edge of weight 0.5 connects node C and node A. Node C is associated with the terms "france" and "arc de triomphe" with some weight for each (e.g., 1). The terms "france" and "arc de triomphe" are propagated from node C to node A through the edge connecting C to A, and the weights of the term propagated from node C to node A are adjusted by the weight of 0.5. In other words, a term's weight at node C is multiplied by the weight of the edge from C to A to get a weight for the term at A. Thus, for example, the term "arc de triomphe" has a weight of 1 at node C, the term is propagated to node A and assigned a weight of 1×0.5=0.5. Further details on term propagation are described below.

A term is assigned a weight with respect to Image A based on weights of edges connected to the node corresponding to the initial image (506). As described above, as a term is propagated through the graph, its weight is multiplied by the weight of an edge it is propagated through. With respect to Image A, the weight of a term propagated to node A is multiplied by the weight of an edge connected to the node A. When the propagation process is complete, one or more terms are associated with node A, with each term having a weight that is calculated based in part on the weights of one or more of the edges connected to the initial image node (e.g., based on the sum or product of the edge weights, which can be normalized). In other words, the weights of the terms are affected by the degrees of similarity between Image A and other images. Further details regarding the term weights are described below in reference to FIG. 6.

Returning to FIG. 3, one or more terms are selected for an image based on the term weights with respect to the image, and the selected terms are associated with the image (308). After the propagation process, an image can be associated with one or more terms. A subset of these terms can be selected and associated with the image. In some implementations, the top X highest weighted terms with respect to the image is selected, where X is any predefined integer of 1 or larger. In some other implementations, any term with a weight with respect to the image that is higher than a predefined threshold is selected and associated with the image. It should be appreciated that the image can be associated with a term with which it was not originally associated before the propagation process.

FIG. 6 illustrates an example image similarity graph 600. The image similarity graph 600 includes image nodes 612, 614, 616, 618, 620, corresponding to images A, B, C, D, and E, respectively. For convenience, the image nodes 612, 614, 616, 618, 620 are referenced below as nodes A, B, C, D, or E, respectively. Nodes A, B, C, D, and E are connected by edges. Each edge in the graph can be weighted by the degree of similarity between the images corresponding to the nodes connected by the edge. In some implementations, the graph 600 is fully connected, i.e., each image node is connected to each other image node by a weighted edge. In some other implementations, the graph need not be fully connected; some edges can be omitted or elided. In an exemplary implementation, an edge is elided if its weight (i.e., the degree of similarity or a value that is a function of the degree of similarity) is not above a specified threshold. In such an implementation, the similarity graph includes edges for image pairs that meet some minimum level of similarity. In some other implementations, the edges in the similarity graph can be a random subset of all of the possible edges in the graph. In some other implementations, the edges in the graph 600 correspond to the subset of unique image pairs for which degrees of similarity were determined, as described above in reference to FIG. 4; an edge connects two nodes corresponding to a pair of images for which a degree of similarity was determined. In further implementations, the similarity graph is a maximum spanning tree. The dotted lines in graph 600 represent the edges that are elided.

As described above, the edges in graph 600 have respective weights. In graph 600, the edge connecting A and B has a weight of 0.1, and the edge connecting A and C has a weight of 0.5. The edge connecting B and E has a weight of 0.3. The edge connecting B and D has a weight of 0.9. The edge connecting C and E has a weight of 0.1.

In some implementations, the edges between image nodes are undirected (i.e., bi-directional). In some other implementations, the edges between the image nodes are directed (i.e., unidirectional). Images can be compared based on how much of one image is in the other, and an edge can be directed based on the comparison. For example, an edge between Image A and Image B can be directed from Image A to Image B if an object that takes up a large portion of Image A is also in Image B and takes up a small portion of Image B. In graph 600, the directed edges have an arrow end indicating the direction, while the edges without arrow ends are undirected.

In some implementations, the graph 600 includes one or more injector nodes 602, 604, 606, 608. An injector node is connected to an image node by a directed edge of weight 1, directed from the injector node to the image node. An injector node can inject term weights into an image node. In some implementations, the terms at an injector node connected to an image are the terms initially associated with the image and which are derived from the image metadata or from other content associated with the image, as described in reference to block 302 (FIG. 3). For example, injector node 602 injects weights for terms "paris," "france," and "eiffel tower" into node A; the image corresponding to node A is associated with the terms "paris," "france," and "eiffel tower." Injector node 604 injects weights for terms "paris" and "uncle leo" into node E. Injector node 606 injects weights for terms "paris" and "arc de triomphe" into node D. Injector node 608 injects weights for terms "france" and "arc de triomphe" into node C. Node B is not connected to an injector node; image B is not initially associated with a term.

In some other implementations, the graph does not include injector nodes; the terms associated with an image are directly associated with the corresponding image node.

In some implementations, a term weight at an injector node can be 1 for each of the terms at the injector node. In some other implementations, some terms at an injector node may be more heavily weighted than other terms at the injector node, to reflect the importance of certain terms. For example, at injector node 602, the term "paris" may have weight 1, term "france" may have weight 1.5, and term "eiffel tower" may have weight 2.

Optionally, in some implementations, the weights at an injector nodes are normalized so that the sum of the term weights is equal to 1. For example, at injector node 602, assuming a weight of 1 for each of the terms "paris," "france," and "eiffel tower," the normalized weights will be 1/(1+1+1)=⅓ or 0.333 (after rounding) for each of the terms. In other words, weight normalization can be performed by dividing a term weight at a node by the sum of the term weights at the node. In some other implementations, other functions for normalization can be used.

In some implementations, the injector node is a source of constant weight to an image node for the terms with which the corresponding image is initially associated. Each injector node is connected to an image node by a directed edge of weight 1. The directed edge goes from the injector node to the image node but not the other way around.

In some implementations, terms are propagated through the graph and weights assigned to the terms in accordance with an algorithm described in pseudocode below in Table III.

TABLE III

```
Set t = 0
For each image node n in graph G:
    For each term l:
        Initialize the term: n_{l,t} = 0.0
For t = 0 to 999:            // 1000 iterations
    For each injector node n in graph G:
        For each term l:
            Initialize the term amount: n_{l,t+1} = n_{l,t};
    For each image node n in graph G:
        For each term l:
            Initialize the term amount: n_{l,t+1} = 0.0;
        For each node m that has an edge with weight w_{mn}
    to n:
        For each term l:
            n_{l,t+1} = n_{l,t+1} + (w_{mn} * m_{l,t});
        Normalize the weight of the terms at each image
    node n, so that the sum of the term weights at each image
    node = 1.0
```

The algorithm in Table III starts with the initialization of the iteration counter t to 0. The initialization continues with the setting of the term weights at all of the image nodes to 0.

The algorithm then proceeds to an iterative loop. The iterative loop can iterate indefinitely, for a specified number of times, or until each term weight at all of the nodes change by less than a predefined difference threshold. In some implementations, the loop iterates for 1000 times, as shown in Table III.

The term weights at the injector nodes remain the same throughout the iterative loop. This is indicated by the initialization, at each iteration t, of the term weight at t+1 to be equal to the term weight at t for terms at the injection nodes. Further, the term weights at the injector nodes are not affected by term weights at the image nodes because the edge between an injector node and an image node is unidirectional; a term can propagate from an injector node to an image node, but not the other way around. Optionally, the term weights at the injector nodes are normalized before the beginning of the iteration loop.

At each iteration t, the weight ($n_{l,t+1}$) for each term at each image node for the next iteration of propagation is initialized to 0.

Then, the terms at a node are propagated to other nodes and weights are assigned. At a node n, the weight of a term for use in the next iteration (t+1) is the sum of the products of $w_{mn}$ and $m_{l,t}$ for all nodes m connected to node n, where $w_{mn}$ is the weight of the edge connecting m to n, and $m_{l,t}$ is the weight for term l at t. Further, it should be appreciated that node n for this operation cannot be an injector node because there are no nodes connected to an injector node (due to the directed edge from the injector node to an image node but no edge in the other direction). At the end of an iteration, the term weights at the image nodes are normalized.

To illustrate the algorithm shown in Table III, an example run of the algorithm using graph 600 will now be described. At the start of the algorithm, before the iterative loop begins, the term weights at the image nodes are initialized and, optionally, the term weights at the injector nodes are normalized. The term weights at each node after the initialization and normalization are as follows:

|  | A | B | C | D | E | 602 | 604 | 606 | 608 |
|---|---|---|---|---|---|---|---|---|---|
| paris | 0 | 0 | 0 | 0 | 0 | 0.333 | 0.5 | 0.5 | 0 |
| france | 0 | 0 | 0 | 0 | 0 | 0.333 | 0 | 0 | 0.5 |
| eiffel tower | 0 | 0 | 0 | 0 | 0 | 0.333 | 0 | 0 | 0 |
| uncle leo | 0 | 0 | 0 | 0 | 0 | 0 | 0.5 | 0 | 0 |
| arc de triomphe | 0 | 0 | 0 | 0 | 0 | 0 | 0 | 0.5 | 0.5 |

These term weights will be used at iteration t=0 to calculate the weights for iteration t=1.

At the first iteration (t=0), the term weights for the injector nodes are carried over for use in the next iteration (t=1). Then, the terms are propagated to the image nodes through the edges in the graph (which, of course, does not include edges that were elided) and weights assigned to the terms with respect to each of the image nodes. The term weights at the image nodes are then normalized. At the end of iteration t=0, the term weights are the following:

|  | A | B | C | D | E | 602 | 604 | 606 | 608 |
|---|---|---|---|---|---|---|---|---|---|
| paris | 0.333 | 0 | 0 | 0.5 | 0.5 | 0.333 | 0.5 | 0.5 | 0 |
| france | 0.333 | 0 | 0.5 | 0 | 0 | 0.333 | 0 | 0 | 0.5 |
| eiffel tower | 0.333 | 0 | 0 | 0 | 0 | 0.333 | 0 | 0 | 0 |
| uncle leo | 0 | 0 | 0 | 0 | 0.5 | 0 | 0.5 | 0 | 0 |
| arc de triomphe | 0 | 0 | 0.5 | 0.5 | 0 | 0 | 0 | 0.5 | 0.5 |

In iteration t=0, because the term weights at the image nodes are 0 before the propagation, the term weights come entirely from the injector nodes.

These term weights are used in iteration t=1 to calculate the term weights for iteration t=2. At the beginning of iteration t=1, the term weights for the injector nodes are carried over for use in iteration t=2. For an image node, the term weights are calculated. For example, for node A, which is connected to nodes 602, B, and C, the term weight for term "france" to be used in t=2 is as follows:

| | |
|---|---|
| weight = 0 | // initialize weight to 0 |
| weight = 0 + (0.333 * 1) = 0.333 | // add adjusted term weight from node 602 |
| weight = 0.333 + (0 * 0.1) = 0.333 | // add adjusted term weight from node B |
| weight = 0.333 + (0.5 * 0.5) = 0.583 | // add adjusted term weight from node C |

The weight for term "france" for the next iteration is initialized to 0. Then, weights for term "france" from nodes connected to node A is added to the weight. Note that the weights from the nodes connected to node A are adjusted by the weights of the respective edges to node A. For example, the weight from node C is adjusted by multiplying it by 0.5, which is the weight of the edge connecting node A to node C (i.e., the degree of similarity between the image corresponding to node A and the image corresponding to node C).

Further, it should be appreciated that the weight for term "france" at node A at the end of iteration t=0 is not used to calculate the weight for term "france" node A during iteration t=1.

Thus, the weight for term "france" at node A for use in iteration t=2, before normalization, is 0.583. At the end of the iteration t=1, this weight and other term weights in the graph 600 are normalized. At the end of iteration t=1, the normalized term weights are the following:

|  | A | B | C | D | E | 602 | 604 | 606 | 608 |
|---|---|---|---|---|---|---|---|---|---|
| paris | 0.222148 | 0.487191 | 0.13542 | 0.5 | 0.454545 | 0.333 | 0.5 | 0.5 | 0 |
| france | 0.388926 | 0.025617 | 0.41666 | 0 | 0.045455 | 0.333 | 0 | 0 | 0.5 |
| eiffel tower | 0.222148 | 0.025617 | 0.10417 | 0 | 0 | 0.333 | 0 | 0 | 0 |
| uncle leo | 0 | 0.115393 | 0.03125 | 0 | 0.454545 | 0 | 0.5 | 0 | 0 |
| arc de triomphe | 0.166778 | 0.34618 | 0.3125 | 0.5 | 0.045455 | 0 | 0 | 0.5 | 0.5 |

These weights are used to calculate the term weights during iteration t=2, for use in iteration t=3. At the end of iteration t=2, the normalized term weights, to be used in iteration t=3, are as follows:

|  | A | B | C | D | E | 602 | 604 | 606 | 608 |
|---|---|---|---|---|---|---|---|---|---|
| paris | 0.281068 | 0.468137 | 0.09783 | 0.4939 | 0.471214 | 0.333 | 0.5 | 0.5 | 0 |
| france | 0.340146 | 0.040407 | 0.43688 | 0.0121 | 0.035251 | 0.333 | 0 | 0 | 0.5 |
| eiffel tower | 0.24243 | 0.017088 | 0.06942 | 0.0121 | 0.01293 | 0.333 | 0 | 0 | 0 |
| uncle leo | 0.016988 | 0.104895 | 0.02841 | 0.0547 | 0.384102 | 0 | 0.5 | 0 | 0 |
| arc de triomphe | 0.119367 | 0.369472 | 0.36746 | 0.4271 | 0.096503 | 0 | 0 | 0.5 | 0.5 |

Depending on the particular implementation, the iteration loop can iterate indefinitely, until the specified amount of iterations has run, or until each respective term weight changes between iterations by less than a predefined difference threshold. In some implementations, the predefined difference threshold e is 0.00000001. In other words, the loop can stop when the absolute value of the difference between the term weights for a term at a node for iterations t+1 and t is less than or equal to $\epsilon$ for all nodes and all terms in the graph.

The algorithm in Table III propagates terms to the image nodes of graph 600 and assigns weights. Even for a node that was not associated with any term before the algorithm, the algorithm can propagate terms to that node. After the loop has stopped, for a node, each term has a weight. After the iterations have run, the image search engine can select, for a node, a subset of the terms to associate with the node. In some implementations, the search engine can select the top Y highest weighted terms with respect to the node, where Y is an integer 1 or greater. For example, for node A, if the algorithm stopped at the end of iteration t=2 and Y is 2, then the terms "paris" and "france" would be selected and associated with the image corresponding to node A because these two terms are the 2 highest weighted with respect to node A. In some other implementations, all terms whose weights with respect to the node meet or exceed a predefined minimum weight threshold are selected and associated with the node. In some implementations, the terms associated with a node, and thus associated with the image corresponding to the node, can be used as keywords for the image in an image search engine or as targeting keywords for advertisements.

In some implementations, for an image that was associated with one or more terms a priori (e.g., terms from the image metadata, terms determined from a webpage in which the image appears, etc.), before the term propagation algorithm, the image search engine can use the a priori terms or the terms selected as a result of the term propagation algorithm. It should be appreciated that the set of a priori terms and the set of terms selected from the term propagation algorithm are not necessarily the same.

In some implementations, a similarity graph can be generated for a subset of the images in the image search engine and the term propagation algorithm can be performed for the graph of the subset of images. For example, the subset of images can be the images from a particular domain or website, images that have a particular characteristic, images from a website that are associated with a particular term, and so forth.

The algorithm in Table III above was described in reference to a similarity graph that includes injector nodes. However, the algorithm can be adapted for use with similarity graphs that do not include injector nodes, where the terms initially associated with images are associated with the image nodes rather than an injector node.

In some implementations, the similarity graph can include dummy nodes. A dummy node behaves like an injector node; the dummy node is associated with a dummy term, which is associated with a weight, and the dummy node injects into the graph the weight of the dummy term. The dummy term and its weight is propagated through the graph in the same manner as the other terms and their weights are propagated. The additional weight can be used to dilute (by increasing the total pre-normalization weight at an image node) term weights that are propagated from distant nodes, and thus reduce the influence, on the term weights at an image node, of term weights from distant nodes. When terms are selected for a node (as described in reference to block 308, for example), the dummy terms and their weights are ignored. For example, the dummy terms and their respective weights at an image node are not considered when selecting terms by taking the top Y highest weighted terms. The graph can include a dummy node for each image node or only for the image nodes that do not have a corresponding injector node (e.g., node B in graph 600).

In some implementations, before the iterative loop begins, the weights of a term across all injector nodes can be normalized. For example, the weights of the term "paris" at nodes 602, 604, and 606 can be normalized so that these weights sum to 1.

In some other implementations, other algorithms for selecting terms for a node using a similarity graph can be used. An example is an algorithm based on random walks. For convenience, the algorithm will be described below in reference to similarity graph 600. The algorithm begins by generating the similarity graph 600, but reversing the direction of any directed edge. Thus, for example, the edge connecting node A to node 602 is directed from node A to node 602, rather than the other way around. A bi-directional edge is left as is. Then, the algorithm proceeds by performing random walks from an image node of interest, i.e., a node for which one or more terms are desired. At each node starting from the node of interest, the edge leading out to the next node is randomly selected. If the edges are weighted, the out edge can be selected using the (optionally normalized) edge weights as probabilities. If a walk reaches an image node, the walk is continued until the walk reaches an injector node. When a walk reaches an injector node, a count is incremented for each term that is associated with the injector node, and the algorithm proceeds to perform a new walk starting from the node of interest. A random walk is performed multiple times (e.g., 1000 times, 100000 times, etc.) for each node of interest. The term weights for a node of interest is derived from the proportions of the counts for the terms maintained for the random walks from the node of interest.

Figure 7:
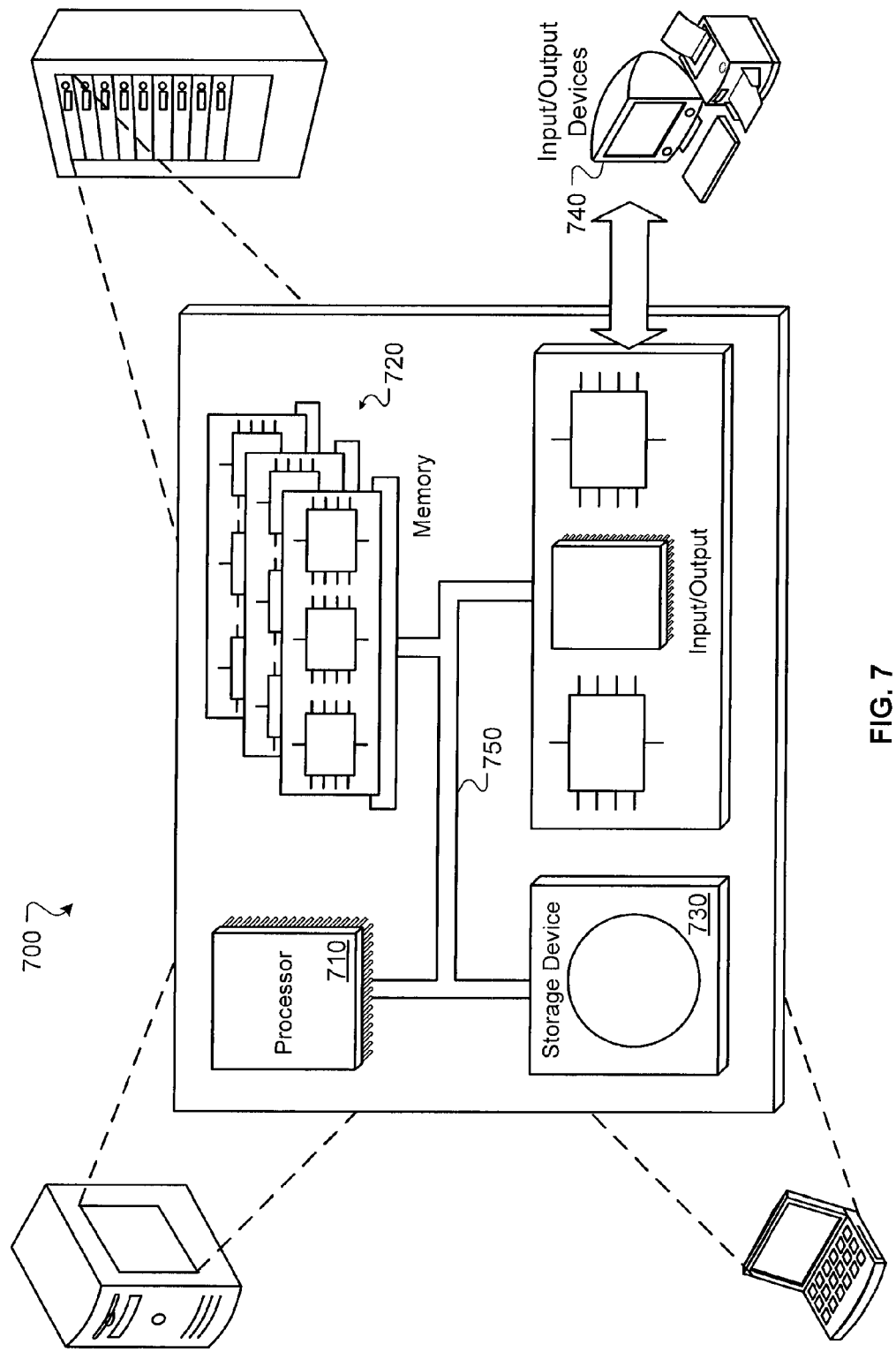
FIG. 7 is a block diagram illustrating a generic computer system.

FIG. 7 is a schematic diagram of a generic computer system 700. The system 700 can be used for practicing operations described in association with the technique 300. The system 700 can include a processor 710, a memory 720, a storage device 730, and input/output devices 740. Each of the components 710, 720, 730, and 740 are interconnected using a system bus 750. The processor 710 is capable of processing instructions for execution within the system 700. Such executed instructions can implement one or more components of image search engine 200, for example. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 is a computer readable medium such as volatile or non-volatile memory that stores information within the system 700. The memory 720 could store data structures representing image repository 214, for example. The storage device 730 is capable of providing persistent storage for the system 700. The storage device 730 may be a floppy disk device, a hard disk device, an optical disk device, or a tape device, or other suitable persistent storage means. The input/output device 740 provides input/output operations for the system 700. In one implementation, the input/output device 740 includes a keyboard and/or pointing device. In another implementation, the input/output device 740 includes a display unit for displaying graphical user interfaces.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method, comprising:
   receiving, at a computer system, a plurality of images, wherein one or more of the images are associated with one or more terms;
   for each of a plurality of pairs of images in the plurality of images, determining, by the computer system, a degree of similarity between the two images in the pair, including for a first image in the plurality of images determining degrees of similarity between the first image paired with one or more other images from the plurality of images;
   for the first image, assigning to one or more of the terms a respective weight with respect to the first image based at least in part on the degrees of similarity between the first image and the one or more other images; and
   selecting, by the computer system, one or more of the terms to associate with the first image based on the respective weights of the terms with respect to the first image and associating the selected terms with the first image.

2. The method of claim 1, wherein determining degrees of similarity between a plurality of pairs of images in the plurality of images comprises:
   comparing the first image of the plurality of images to a second image of the plurality of images.

3. The method of claim 2, wherein comparing the first image to the second image comprises:
   identifying one or more features of the first image;
   identifying one or more features of the second image; and
   comparing the features of the first image to the features of the second image.

4. The method of claim 3, wherein:
   the features of the first image comprise one or more global features of the first image; and
   the features of the second image comprise one or more global features of the second image.

5. The method of claim 3, wherein:
   the features of the first image comprise one or more local features of the first image; and
   the features of the second image comprise one or more local features of the second image.

6. The method of claim 3, wherein:
   the features of the first image are associated with one or more points of interest in the first image; and
   the features of the second image are associated with one or more points of interest in the second image.

7. The method of claim 3, wherein the features of the first image and the features of the second image comprise scale-invariant features.

8. The method of claim 1, wherein assigning to one or more of the terms a respective weight with respect to the first image based on the degrees of similarity comprises:
   generating a weighted graph data structure, the weighted graph data structure comprising a plurality of nodes, each of the nodes corresponding to a respective image of the plurality of images, the plurality of nodes including a node corresponding to the first image, the nodes connected by weighted edges, wherein an edge connecting a first respective node to a second respective node is weighted based on a degree of similarity between an image corresponding to the first respective node and an image corresponding to the second respective node, wherein the terms are associated with one or more of the nodes;

propagating the terms to the first node, including assigning to a term a weight with respect to the first image based at least on the weights of the edges connected to the first node.

9. A system, comprising:
one or more processors; and
a computer-readable medium storing instructions for execution by the one or more processors, the instructions comprising instructions to:
receive a plurality of images, wherein one or more of the images are associated with one or more terms;
for each of a plurality of pairs of images in the plurality of images, determine a degree of similarity between the two images in the pair, including for a first image in the plurality of images determining degrees of similarity between the first image paired with one or more other images from the plurality of images;
for the first image, assign to one or more of the terms a respective weight with respect to the first image based at least in part on the degrees of similarity between the first image and the one or more other images; and
select one or more of the terms to associate with the first image based on the respective weights of the terms with respect to the first image and associate the selected terms with the first image.

10. The system of claim 9, wherein the degrees of similarity between the first image and the one or more other images are determined by comparing a first histogram for the first image with one or more other histograms for the one or more other images.

11. The system of claim 10, wherein the first histogram comprises a color histogram, an edge histogram, an intensity histogram, or a texture histogram for the first image; and wherein the one or more other histograms comprise one or more color histograms, one or more edge histograms, one or more intensity histograms, or one or more texture histograms for the one or more other images.

12. A computer program product, encoded on a computer-readable storage medium, configured to cause a data processing apparatus to perform operations comprising:
receiving a plurality of images, wherein one or more of the images are associated with one or more terms;
for each of a plurality of pairs of images in the plurality of images, determining a degree of similarity between the two images in the pair, including for a first image in the plurality of images determining degrees of similarity between the first image paired with one or more other images from the plurality of images;
for the first image, assigning to one or more of the terms a respective weight with respect to the first image of the plurality of images based at least in part on the degrees of similarity between the first image and the one or more other images; and
selecting one or more of the terms to associate with the first image based on the respective weights of the terms with respect to the first image and associating the selected terms with the first image.

13. The computer program product of claim 12, wherein determining the degrees of similarity between the first image and the one or more other images comprises: determining feature similarity scores for the first image and of the one or more other images, wherein each of the feature similarity scores are determined with regard to a feature from a plurality of features; weighting the feature similarity scores based on weights associated with the plurality of features, wherein the weights correspond to a level of importance for each of the plurality of features in indicating similarity between the first image and the one or more other images; and combining the weighted feature similarity scores to determine the degrees of similarity between the first image and the one or more other images.

14. The computer program product of claim 13, wherein features from the plurality of features are selected from the group consisting of: color, intensity, edges, and texture.

15. A system, comprising:
one or more memories configured to receive a plurality of images, wherein one or more of the images are associated with one or more terms;
one or more data processing apparatus including:
means for determining, for each of a plurality of pairs of images in the plurality of images, a degree of similarity between the two images in the pair, including determining, for a first image in the plurality of images, degrees of similarity between the first image paired with one or more other images from the plurality of images;
means for assigning to one or more of the terms a respective weight with respect to the first image based at least on the degrees of similarity between the first image and the one or more other images; and
means for selecting one or more of the terms to associate with the first image based on the respective weights of the terms with respect to the first image and associating the selected terms with the first image.

16. A method, comprising:
receiving, at a computer system, a plurality of images, wherein one or more terms are associated with one or more of the images;
for each of a plurality of pairs of images in the plurality of images, determining, by the computer system, a degree of similarity between the two images in the pair;
generating a weighted graph data structure, the weighted graph data structure having nodes corresponding to the images, wherein an edge connecting a first node and a second node of the weighted graph data structure has a weight based on a degree of similarity between an image corresponding to the first node and an image corresponding to the second node;
propagating, by the computer system, the terms to the nodes of the weighted graph data structure based on the weighted edges, wherein for each node, the one or more terms propagated to the node are assigned a weight that is based at least in part on the weight of one or more edges connected to the node; and
selecting one or more terms for a respective image of the plurality of images based on the one or more respective weights assigned to the one or more terms at the node that corresponds to the respective image and associating the selected terms with the respective image.

17. The method of claim 16, wherein determining degrees of similarity between a plurality of pairs of images in the plurality of images comprises:
comparing a first image of the plurality of images to a second image of the plurality of images.

18. The method of claim 17, wherein comparing the first image to the second image comprises:
identifying one or more features of the first image;
identifying one or more features of the second image; and
comparing the features of the first image to the features of the second image.

19. The method of claim 18, wherein:
the features of the first image comprise one or more local scale-invariant features of the first image; and the features of the second image comprise one or more local scale-invariant features of the second image.

20. A system, comprising:
one or more processors; and
a computer-readable medium storing instructions for execution by the one or more processors, the instructions comprising instructions to:
receive a plurality of images, wherein one or more terms are associated with one or more of the images;
for each of a plurality of pairs of images in the plurality of images, determine a degree of similarity between the two images in the pair;
generate a weighted graph data structure, the weighted graph data structure having nodes corresponding to the images, wherein an edge connecting a first node and a second node of the weighted graph data structure has a weight based on a degree of similarity between an image corresponding to the first node and an image corresponding to the second node;
propagate the terms to the nodes of the weighted graph data structure based on the weighted edges, wherein for each node, the one or more terms propagated to the node are assigned a weight that is based at least in part on the weight of one or more edges connected to the node; and
select one or more terms for a respective image of the plurality of images based on the one or more respective weights assigned to the one or more terms at the node that corresponds to the respective image and associating the selected terms with the respective image.

21. The system of claim 20, wherein the degree of similarity between a first image corresponding to the first node and a second image corresponding to the second node is determined based on a number of shared keypoints between the first image and the second image, wherein a keypoint comprises a point of interest in an image that, together with other keypoints, identifies an object in the image, wherein a shared keypoint comprises keypoints in the first image and the second image with one or more matching features.

22. The system of claim 21, wherein the one or more matching features are selected from the group consisting of: color, intensity, edges, and texture.

23. A computer program product, encoded on a computer-readable storage medium, configured to cause a data processing apparatus to perform operations comprising:
receiving a plurality of images, wherein one or more terms are associated with one or more of the images;
for each of a plurality of pairs of images in the plurality of images, determining a degree of similarity between the two images in the pair;
generating a weighted graph data structure, the weighted graph data structure having nodes corresponding to the images, wherein an edge connecting a first node and a second node of the weighted graph data structure has a weight based on a degree of similarity between an image corresponding to the first node and an image corresponding to the second node;
propagating the terms to the nodes of the weighted graph data structure based on the weighted edges, wherein for each node, the one or more terms propagated to the node are assigned a weight that is based at least in part on the weight of one or more edges connected to the node; and
selecting one or more terms for a respective image of the plurality of images based on the one or more respective weights assigned to the one or more terms at the node that corresponds to the respective image and associating the selected terms with the respective image.

24. A system, comprising:
one or more memories configured to receive a plurality of images, wherein one or more terms are associated with one or more of the images;
one or more data apparatus including:
means for determining, for each of a plurality of pairs of images in the plurality of images, degrees of similarity between the two images in the pair;
means for generating a weighted graph data structure, the weighted graph data structure having nodes corresponding to the images, wherein an edge connecting a first node and a second node of the weighted graph data structure has a weight based on a degree of similarity between an image corresponding to the first node and an image corresponding to the second node;
means for propagating the terms to the nodes of the weighted graph data structure based on the weighted edges, wherein for each node, the one or more terms propagated to the node are assigned a weight that is based at least in part on the weight of one or more edges connected to the node; and
means for selecting one or more terms for a respective image of the plurality of images based on the one or more respective weights assigned to the one or more terms at the node that corresponds to the respective image and associating the selected terms with the respective image.

25. A method, comprising:
identifying, by a computer system, similarities between pairs of images in a set of images, wherein, for a particular image in the set of images, particular similarities between the particular image paired with one or more other images from the set of images are identified, wherein one or more images from the set of the images are associated with one or more terms;
representing, by the computer system, the similarities between the pairs of images as weights in a similarity graph, wherein the similarity graph includes i) nodes that represent the set of images and ii) weighted links between the nodes that represent the pairs of images and that include the weights that correspond to the similarities between the pairs of images, wherein a particular node that represents the particular image in the similarity graph is connected by one or more of the weighted links to one or more other nodes that represent the one or more other images, wherein the one or more of the weighted links includes one or more particular weights that correspond to the particular similarities between the particular image and the one or more other images; and
using, by the computer system and for at least the particular image, the similarity graph to identify a set of terms for an image search query, wherein the set of terms is identified based, at least in part, on the one or more particular weights that correspond to the particular similarities between the particular image and the one or more other images, wherein the image search query is specific to the particular image and will produce a search result that includes images that are similar to the particular image.

26. The method of claim 25, further comprising propagating one or more term weights for the one or more terms from one or more nodes that represent the one or more images to the particular node that represents the particular image, wherein the one or more term weights are propagated using the weighted links between the nodes in the similarity graph and, through one or more iterations, results in one or more particular terms weights for the one or more terms at the particular node;

wherein the set of terms is identified further based on a comparison of the one or more particular term weights to a minimum term weight.

* * * * *

UNITED STATES PATENT AND TRADEMARK OFFICE
CERTIFICATE OF CORRECTION

PATENT NO. : 8,356,035 B1
APPLICATION NO. : 11/733734
DATED : January 15, 2013
INVENTOR(S) : Baluja et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 954 days.

Signed and Sealed this
Thirtieth Day of December, 2014

Michelle K. Lee
*Deputy Director of the United States Patent and Trademark Office*